Sept. 1, 1925. Re. 16,155

A. C. V. MALM

PLATEN FOR PRESSES

Original Filed Dec. 22, 1919 2 Sheets-Sheet 1

Inventor
Axel. C. V. MALM.
By
Attorney

Sept. 1, 1925. Re. 16,155
A. C. V. MALM
PLATEN FOR PRESSES
Original Filed Dec. 22, 1919 2 Sheets-Sheet 2
Fig. 5.
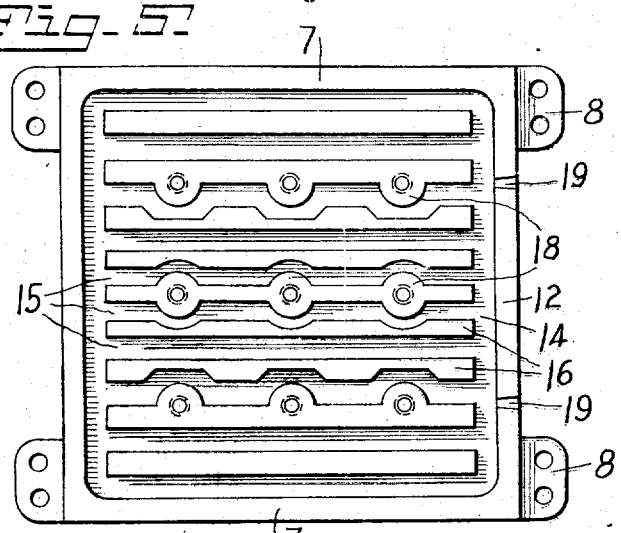
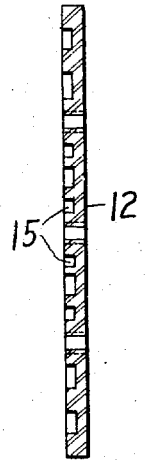
Fig. 7.
Fig. 6.
Fig. 8
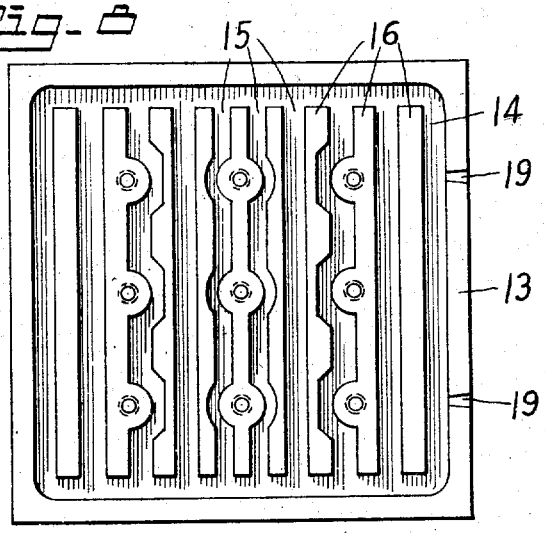
Inventor
Axel. C. V. MALM.
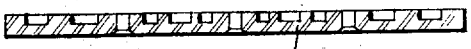
Fig. 9.
By Edward S. Reed
Attorney Reissued Sept. 1, 1925. Re. 16,155

UNITED STATES PATENT OFFICE.

AXEL C. V. MALM, OF LANSDOWNE, PENNSYLVANIA, ASSIGNOR TO E. W. BLISS COMPANY, OF BROOKLYN, NEW YORK, A CORPORATION OF WEST VIRGINIA.

PLATEN FOR PRESSES.

Original No. 1,355,236, dated October 12, 1920, Serial No. 346,563, filed December 22, 1919. Application for reissue filed July 9, 1921. Serial No. 483,766.

*To all whom it may concern:*

Be it known that I, AXEL C. V. MALM, a citizen of the United States, residing at Lansdowne, county of Delaware, State of Pennsylvania, have invented a new and useful Platen for Presses, of which the following is a specification.

This invention relates to platens for presses, such, for example, as the power presses commonly employed for curing rubber, bakelite and the like. One object of the invention is to provide a platen of this kind, the surface of which may be quickly and uniformly heated by the application of steam to the interior thereof.

Another object of the invention is to provide such a device which will be so constructed that a cooling medium, such as water, may be applied thereto immediately after the steam has been cut off, without distorting the platen or causing the same to leak or otherwise injuring the same. Other objects of the invention will appear as the device is described in detail.

Figure 1:
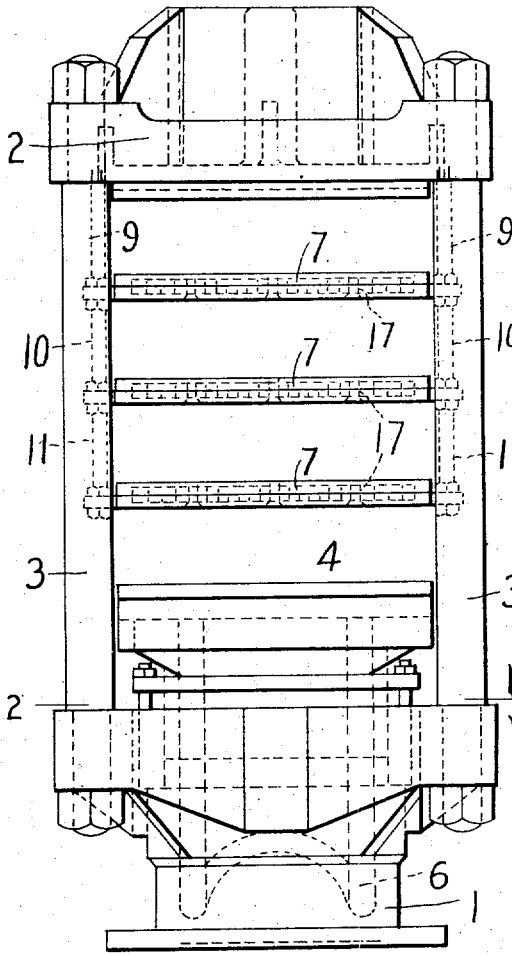
Figure 2:
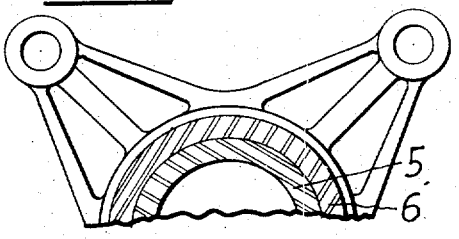
Figure 3:
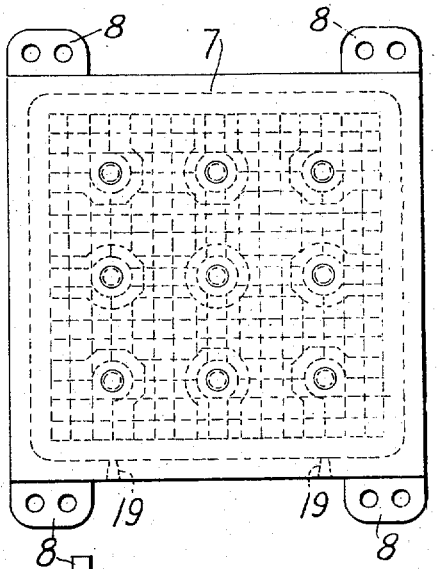
Figure 4:
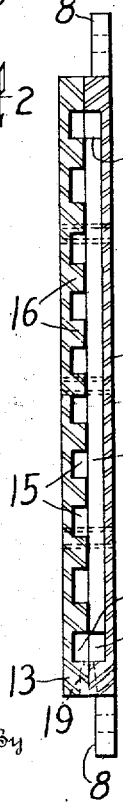

In the accompanying drawings Figure 1 is a side elevation of a press, showing my invention applied thereto; Fig. 2 is a transverse sectional view of a portion of such a press taken on the line 2—2 of Fig. 1; Fig. 3 is a plan view of a platen embodying my invention; Fig. 4 is a transverse sectional view of the same; Fig. 5 is a plan view of the inner face of one of the sections of such a platen; Fig. 6 is an edge view of the section of Fig. 5; Fig. 7 is a transverse sectional view taken on the line 7—7 of Fig. 5; Fig. 8 is a plan view of the inner surface of the other section of the platen; and Fig. 9 is a transverse sectional view taken on the line 9—9 of the section of Fig. 8.

In these drawings I have illustrated one embodiment of my invention, and have shown the same as applied to a power press of a well known construction but it will be understood that the invention may be constructed in various ways and may take various forms, either for the purpose of accommodating it to presses of different kinds or for other purposes.

The press here shown comprises a base 1 and a top plate 2, which is connected to the base by means of vertical rods 3. Mounted on the base 1 is a ram comprising a head 4 and a plunger 5 mounted in a cylinder 6 in the base 1, which may be operated by the application of steam or other fluid. Interposed between the ram and the top plate 2 are a series of platens or pressure plates 7 which are mounted for vertical movement relatively one to the other and to the top plate so that when the material to be cured has been placed between the platens, and between the upper platen and the top plate and the lower platen and the plunger, the upward movement of the ram will cause the several platens to be moved upwardly, one toward the other, and toward the top plate. The platens may be supported in any suitable manner but in the present construction I have provided each platen with a series of lugs, or ears, 8 there being preferably one of these ears at each corner of the platen, which is here shown as square. Depending from the top plate and rigidly secured thereto near the respective corners thereof are four rods, or hangers, 9, each of which extends through an opening in the adjacent lug 8, in the uppermost platen. Secured to each lug of this uppermost platen, preferably by mounting the same in another opening therein, is a hanger, or rod, 10, which extends through an opening in the corresponding lug 8 of the next lower platen. The lugs of this next lower platen are also provided with hangers, or rods, 11 which extend through openings in the lugs 8 of the lowermost platen, there being in the press here shown but three platens. It will be apparent that each platen is free to move vertically on its hangers and that the hangers themselves will move vertically with the platens to which they are secured.

Each platen is provided with a chamber within which steam or other fluid may circulate and this chamber is so constructed and arranged that the steam will come in contact with relatively large portions of the upper and lower walls of the platen. It is, of course, necessary that the platen shall be of a very strong, durable character and I prefer to make the same steel. To facilitate the manufacture thereof I prefer to form the same in two sections which may be placed face to face and rigidly secured one to the other. The two sections are so arranged with relation one to the other that portions of their inner surfaces will be spaced apart, and are tightly connected at their edges, thus forming between the sections a chamber to receive a fluid, such as steam for curing or water for cooling. The sections may have said portions of their adjacent faces spaced apart in any suitable manner to form the chamber, as, for example, by providing one or both of the sections with a recess or channel in the inner face thereof, and the chamber may, if desired, comprise a plurality of connected parts, thus forming a relatively long channel through which the fluid may circulate. In the construction here illustrated each section is provided in its face with channels, the channels of the two sections being so arranged that they will be in communication one with the other and that the greater portions of the inner surfaces of both sections will be exposed directly to the steam in the channels of one, or both, of the sections, and further, the arrangement is such that those portions of the surfaces which are not exposed directly to the steam will be relatively small and will be surrounded by portions which are in contact with the steam. The platen may be of any suitable shape and the sections may taken various forms. In the present construction the platen is substantially square and the sections are flat. The two sections in the present instance are very similar in their construction and the lower section which is indicated by the reference numeral 12, carries the ears, 8, while the upper section, 13, does not have ears. As has been stated, the channels in the sections may take various forms, but in the present instance I have shown each section as having a channel 14 extending completely about the same near its outer edges. A series of substantially parallel channels 15 extend transversely to the section and communicate at their ends with the surrounding channel 14. When the two sections are assembled to form the platen the channels 15 of the one section extend transversely to the channels 15 of the other section so that the ribs 16 which separate the channels 15, will intersect and rest one upon the other. Because of the intersecting arrangement of the channels it will be apparent that the steam, or other fluid which may be caused to circulate therein, will come directly in contact with the channeled portions of both sections and with the inner surfaces of the ribs where they intersect the channels. The only portions of the surfaces which do not come in direct contact with the steam are those portions of the ribs which intersect and rest one upon the other, and these portions are surrounded by the channels. As a result of this construction the surfaces of the platen are very quickly and uniformly heated. The two sections are rigidly secured one to the other preferably by means of a series of screws 17, which extend through the ribs at their points of intersection, the ribs being preferably enlarged, as shown at 18, to provide ample support for the screws. The sections are further secured one to the other in such a manner as to form fluid tight joints surrounding the chamber and this is preferably accomplished by welding their adjacent edges together. This welded joint is not only very strong and durable but it forms a perfect fluid tight connection between the two sections. Consequently, the platen is of a very strong, durable construction and will not be injuriously affected by the injection of a cooling medium into the channels immediately after the steam is cut off and while the platen is still hot. The manner of connecting the two sections, as well as the construction of the two sections, is such that there will be little or no tendency to warp or become distorted by the sudden changes in temperature and the welded joints at the edges of the sections will not be liable to break and thus cause leakage. A further advantage of the welded joints is that they do away with all packing between the two sections. Not only is the platen as here constructed highly efficient and of a strong, durable character, but it can be readily and cheaply manufactured as the sections are each cast, or otherwise formed, in one piece and very little machine work is required.

The platen may be provided with an inlet and an outlet of any suitable character and arrangement. In the present instance I have shown two ports, 19, leading through the edge of the platen and communicating with the outer channel 14. In the present arrangement the ports are both arranged in the same edge of the platen and are adapted to have steam pipes connected therewith. Preferably the outlet of one platen is connected with the inlet of the other so that the steam passes in series through the several plates. Obviously the top plate and the head 4 of the ram may be constructed in a similar manner and may, if desired, be connected in series with the platens.

I believe myself to be the first to construct a platen of this kind of two metal plates connected one to the other and having a chamber between them, and while I have shown and described one embodiment of my invention, I wish it to be understood that I do not desire to be limited to the details thereof as various modifications may occur to a person skilled in the art.

Having now fully described my invention what I claim as new and desire to secure by Letters Patent, is:

1. A device of the character described, comprising two sections arranged face to face, connected one to the other and each having a plurality of connected channels in its inner face, and having an inlet and an outlet leading respectively to and from said channels.

2. A device of the character described, comprising two sections arranged face to face, connected one to the other and each having a plurality of connected channels in its inner face, the channels of one section being arranged to communicate with the channels of the other section, and having an inlet and an outlet leading respectively to and from said channels.

3. A device of the character described comprising two sections placed face to face, each section having substantially parallel channels and the channels of the two sections extending transversely one to the other, said device also having inlet and outlet ports leading to and from said channels, and said sections being connected one to the other to form steam tight joints at their edges.

4. A device of the character described comprising two sections placed face to face, rigidly connected one to the other and having channels in their adjacent faces, the channels in one section being arranged to intersect the channels in the other section, said device also having inlet and outlet ports leading to and from said channels.

5. A device of the character described comprising two sections placed face to face, rigidly secured one to the other and each having in its inner face a channel extending about the same near the edges thereof and other channels extending across the same and communicating with the first mentioned channel, the last mentioned channels of one section intersecting the corresponding channels of the other section, and inlet and outlet ports leading to and from said channels.

6. A device of the character described comprising two flat sections of corresponding shape placed face to face and each having in its inner face a channel extending entirely about the same near the outer edge thereof and other channels communicating at their ends with the first mentioned channel, the several channels of the one section being arranged to communicate with the corresponding channels of the other section, and inlet and outlet ports leading to and from said channels, said sections being rigidly connected one to the other to form steam tight joints at their edges.

7. A device of the character described comprising two sections placed face to face and having channels in their adjacent faces so arranged that the channels in one section will intersect the channels in the other section, and having inlet and outlet ports leading to and from said channels, said sections being welded one to the other at their edges, and fastening devices connecting intermediate portions of said sections one to the other.

8. A device of the character described comprising two sections placed face to face and each having in its inner face a channel extending about the same near the edges thereof, and substantially parallel channels communicating at their opposite ends with the first mentioned channel, the last mentioned channels of the one section extending transversely to the channels of the other, and inlet and outlet ports leading to and from said channels, said sections being welded one to the other along their edges.

9. A device of the character described comprising two sections placed face to face, each section having in its inner face a channel extending about the same near the edge thereof, and having transverse channels communicating at their ends with the first mentioned channel and separated by ribs and the ribs of the two sections intersecting and resting one upon the other, said sections being connected one to the other to form steam tight joints at their edges.

10. A device of the character described comprising two sections placed face to face, each section having in its inner face a channel extending about the same near the edge thereof, and having transverse channels communicating at their ends with the first mentioned channel and separated by ribs, the ribs of the two sections intersecting and resting one upon the other, and fastening devices extending through intersecting portions of said ribs.

In testimony whereof I affix my signature hereto.

AXEL C. V. MALM.